Patented Dec. 5, 1950

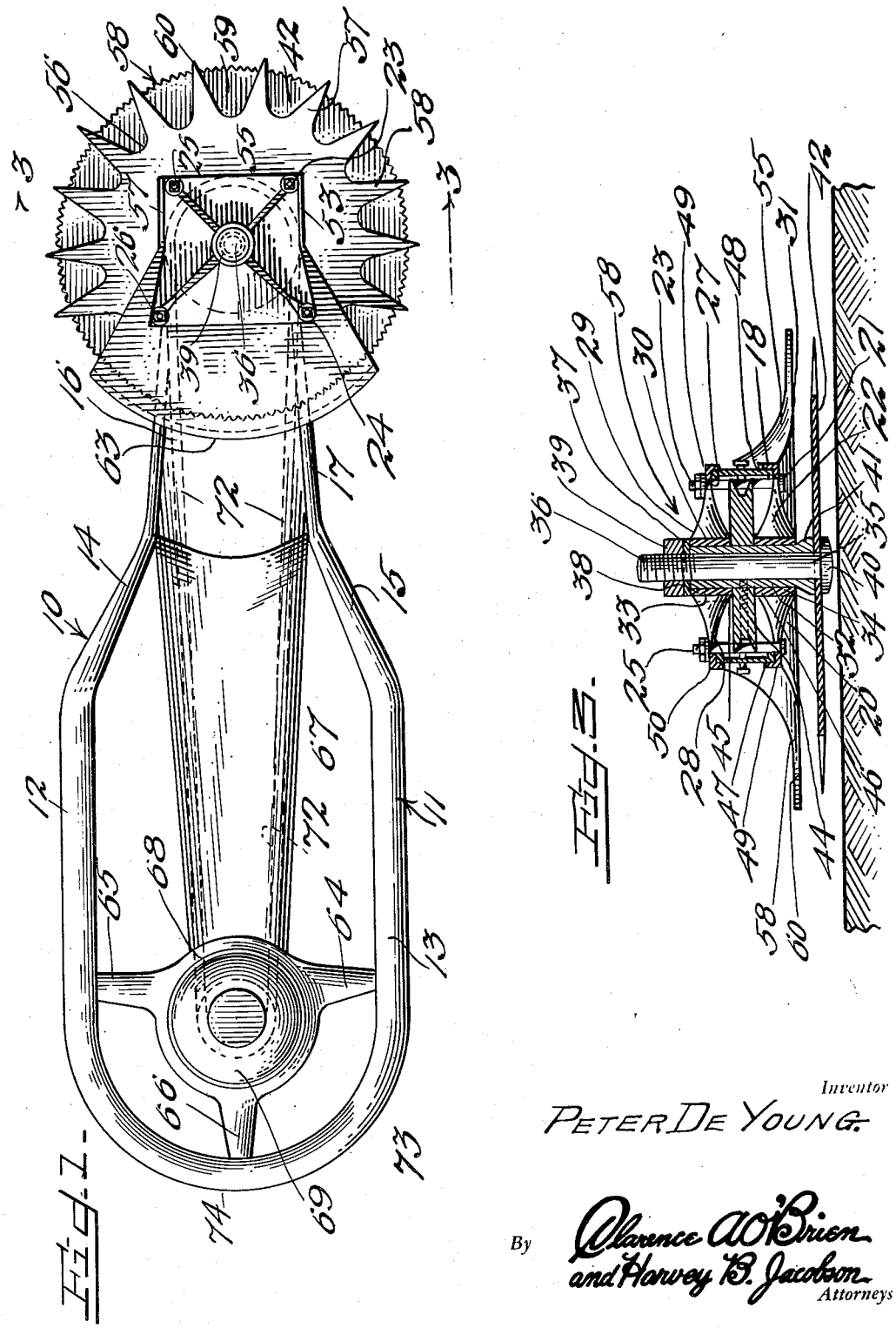

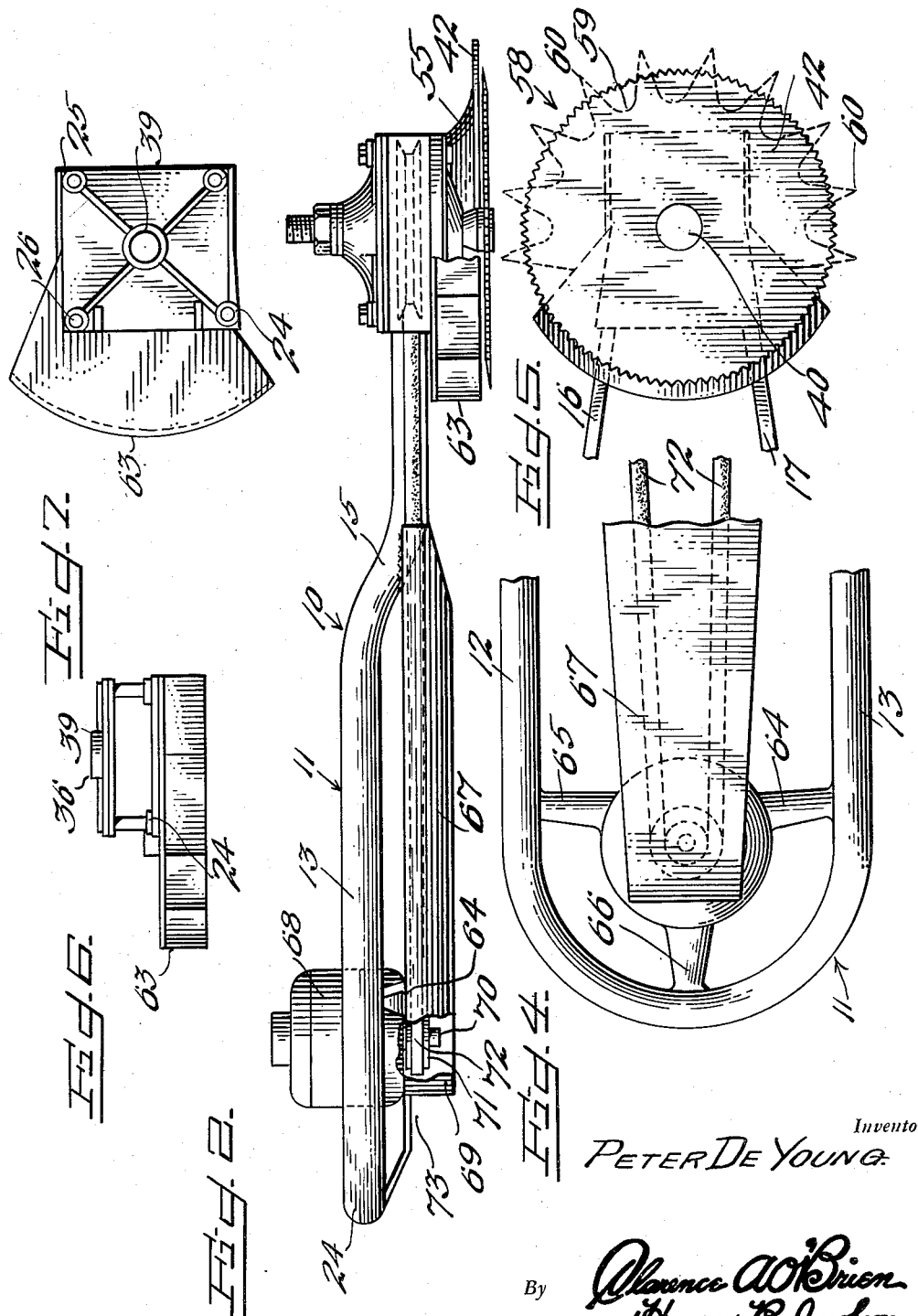

2,532,982

UNITED STATES PATENT OFFICE 2,532,982

MOTOR OPERATED HEDGE OR GRASS TRIMMER

Peter De Young, Clifton, Tex.

Application January 29, 1946, Serial No. 644,074

5 Claims. (Cl. 30—167)

This invention relates to a hedge trimmer and has for an object to provide a combined hedge and sidewalk edge grass trimmer.

Another object of the invention is to provide an electric hedge trimmer.

A further object of my invention is to provide in a hedge trimmer a combination saw guard and hedge stem director.

A still further object of the invention is to provide means on a hedge trimmer whereby the same may be used for a grass edge trimmer.

Other features and advantages will become more readily apparent from the following description and the accompanying illustrative drawings in which:

Figure 1 is a plan view of my trimmer,

Figure 2 is a side elevational view thereof,

Figure 3 is a sectional view taken on line 3—3 of Figure 1,

Figure 4 is a bottom plan view of one end of the device broken off,

Figure 5 is a similar view of the other end of the trimmer,

Figure 6 is a detail side elevational view of a guard member, and

Figure 7 is a top plan view thereof.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise without in any way departing from the spirit and intention of the device which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout and in which 10 refers to the invention in its entirety and 11 indicates a frame which may be formed either of a light metal or bent wood. The arms 12 and 13 of the frame are inclined down at 14 and 15 and then flattened and extended horizontally as at 16 and 17 to the ends between which channel-irons 18 and 19 are secured. (If the frame is formed of metal, said ends are shaped to said channel-irons.)

Supported by said irons 18 and 19 are the opposite sides 20 and 21 of a bearing member 22 into which sides thereof are supported four vertical bolts 23, 24, 25 and 26. Upon the upper ends of said bolts is secured the sides 27 and 28 of another bearing member 29.

The said bearings 22 and 29 are provided with aligning spaced apart bores 30 and 31 through which a tube 32 extends which tube is rotatably supported in a pair of spaced apart collars 33 and 34 fixedly secured through the bores 30 and 31 and to said bearings 22 and 29. Projecting through the tube 32 is a bolt 35 on the threaded upper and outer end 36 of which is a washer 37 seating upon the upper end 38 of the tube 32 and a nut 39.

Mounted upon said bolt 35 between its enlarged head 40 and the flared and enlarged lower end 41 of the tube 32 is a circular saw or cutter 42 which is for trimming hedges and shrubbery limbs. However, the saw is readily removable simply by removing nut 39 from the bolt 35, withdrawing the same and substituting a walk and border edge trimming saw (not shown).

Fixedly mounted upon the tube 32 by key 43 or otherwise is a pulley 44 which seats between the inner ends 45 and 46 of the collars 33 and 34.

Channel irons 47 and 48 are supported vertically on each side respectively of the bearings 22 and 29 by the angle-irons 18 and 19, 49 and 50. The flanges 51 and 52 of each of the said channel-irons bear against bolts 23 and 24 and 25 and 26 respectively and form means for supporting the sides 53 and 54 of a removable star guard 55 formed two-thirds of the way around the periphery 56 from which project spaced apart points 57, 58, etc., which when the guard is mounted upon the cutter head 58' of the device project somewhat beyond the teeth 59 of the saw 42 as indicated at 60. The said sides 53 and 54 of the guard include spaced horizontal fingers 61 and 62 adapted to straddle set bolts having means for clamping said guard to the cutter head. Supported by the arm members 16 and 17 is a segmental guard 63 which forms the double function of protecting the hands of a user from the saw 42 and preventing cuttings from being thrown rearwardly upon said user.

Mounted between the arms 12 and 13 by means of the inclined arms 64, 65 and 66 connected to the arms 12 and 13 is a housing or belt shield 67, the end 68 of which forms a seat for an electric motor 69. The shaft 70 of the motor projects into the housing 67 and has fixed thereon a V-pulley 71 driving a V-belt 72 which belt is also trained over the pulley 44 through which the tube 32, bolt 35 and saw 42 are driven. The pulley 71 depending into housing 67 is on a common plane with pulley 44.

While the above described trimmer may appear somewhat complicated, as a matter of fact it is very simple, light in weight and extremely easy to handle. The length of the arms 13 and 14 are approximately that of a man's arms. The motor 69 mounted at the end 73 of the device is a counterbalance for the cutter head weight and being spaced away from the saw, the latter is not affected by motor vibrations. In trimming walk and border grass edges the terminal 74 of the frame acts as a handle whereby the saw may be suspended vertically and the depth of cut may be very easily controlled merely by raising or lowering of the hand of the user.

The guard 55 is adjustable through means of the set bolts 75 and 76 whereby the points 57, 58, etc., may be adjusted relative to the saw teeth 59 in or out according to the heft of work to be done.

From the foregoing specification it will become apparent that the invention disclosed will adequately accomplish the functions for which it has been designed and in an economical manner and that its simplicity, accuracy and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described the invention that which is claimed to be new and desired to be procured by Letters Patent is:

1. A trimmer comprising a tubular substantially U-shaped frame constituting a hand grip and having spaced parallel flattened end portions, said flattened end portions having upper and lower surfaces and side surfaces, an upper bearing plate contacting the upper surfaces of said end portions and having depending flanges bearing against the side surfaces of said end portions, a lower bearing plate contacting the lower bearing surfaces of said end portions and having upstanding flanges bearing against the side surfaces of said end portions, fasteners joining and clamping the bearing plates to the end portions, upper and lower bearing sleeves fixed to said bearing plates and spaced from each other, a tube received in said bearing sleeves, a bolt projecting through the tube and having a threaded upper end, a washer on the upper end of said bolt and a nut threaded on the upper end of said bolt and urging the washer against the tube, a pulley mounted on the tube and disposed between said bearing sleeves, said tube having an enlarged lower end disposed beneath the lower bearing sleeve to limit upward movement of the tube relative to the bearing sleeves, said bolt having a lower head portion, a blade received on the bolt and clamped between the head portion of the bolt and the enlarged lower end of the tube, a motor braced to the frame, an endless belt between the motor and the pulley, a first shield fixed to the frame and the motor for the belt, and a further shield secured to the frame for the blade.

2. A hedge-trimming tool comprising a substantially U-shaped tubular frame having a web portion and spaced leg portions joined by said web portion, a housing located entirely within the frame, arms secured to said housing and also secured to said leg portions adjacent said web portion, an additional arm secured to said housing and to said web portion, upper and lower plates at the end of said frame remote from said housing, said plates receiving said leg portions therebetween, fastening means joining said plates and retaining said plates upon said leg portions, a driven shaft rotatably supported by said plates, a cutter carried by said shaft and paralleling said plates, a motor seated on said housing and including a drive shaft, and a drive connection between the drive shaft and the driven shaft, said drive connection including an endless belt positioned between said spaced leg portions.

3. A hedge-trimming tool comprising a pair of elongated, substantially parallel hand grips having forward and rear end portions; the forward end portions of said hand grips terminating in off-set portions having upper and lower surfaces; an upper clamping plate contacting the upper surfaces of said off-set portions; a lower clamping plate contacting the lower surfaces of said off-set portions; fasteners joining said clamping plates and holding the clamping plates against said off-set portions; upper and lower bearing sleeves secured to said upper and lower plates; a driven shaft rotatably supported by said sleeve and having a lower end projecting below said lower sleeve; a cutter mounted on the lower end of said driven shaft; means securing the cutter to the lower end of said driven shaft for rotation of said driven shaft and said cutter as a unit; a web joining the rear end portions of said hand grips; a motor confined between said hand grips and secured to and supported solely by said hand grips and said web; said motor having a drive shaft; and a drive connection between said drive shaft and said driven shaft and located between said hand grips.

4. A hedge trimming tool comprising a substantially U-shaped tubular frame having a pair of spaced leg portions and a web portion joining said leg portions; a motor confined within said frame and supported solely by said leg portions and said web portion; upper and lower interconnected clamping plates mounted on said leg portions remote from said web portion; a bearing means carried by said plates; a driven shaft rotatably supported by said bearing means; a toothed guard carried by said leg portions; a pulley rotatable with said driven shaft and positioned between said clamping plates; a drive belt forming a connection between said pulley and the drive shaft of said motor; and a cutter blade on said driven shaft and underlying said guard.

5. A trimmer comprising a substantially U-shaped frame having a pair of spaced parallel flattened end portions, upper and lower plates removably secured to said flattened end portions, upper and lower bearing sleeves secured to said plates and spaced from each other, a tube received in said bearing sleeves, a bolt projecting through the tube and having a nut threaded on its upper end, a pulley mounted on the tube for rotation with the tube, said pulley being disposed between said upper and lower bearing sleeves, said tube having an enlarged lower end disposed beneath the lower bearing sleeve, said bolt having a lower head portion disposed beneath the lower enlarged end of said tube, a blade received on said bolt and clamped between the lower enlarged end of said tube and the head portion of said bolt, an electric motor secured to and supported solely by the frame and disposed at the end of said frame remote from said blade, and an endless belt between said pulley and said motor.

PETER DE YOUNG.

REFERENCES CITED

The following references are of record in the file of this patent:

UNITED STATES PATENTS

| Number | Name | Date |
|---|---|---|
| 844,414 | Seabloom | Feb. 19, 1907 |
| 1,417,669 | Langworthy | May 30, 1922 |
| 1,942,766 | O'Banion | Jan. 9, 1934 |

FOREIGN PATENTS

| Number | Country | Date |
|---|---|---|
| 1,897 of 1903 | Great Britain | Jan. 21, 1904 |